3,331,867
PROCESS FOR PREPARING TETRA(DI-FLUORO-
AMINO)HEXANEDIOL DINITRATE
Robert A. Smiley, Woodbury, N.J., assignor to E. I. du
Pont de Nemours and Company, Wilmington, Del., a
corporation of Delaware
No Drawing. Filed June 8, 1961, Ser. No. 115,823
3 Claims. (Cl. 260—467)

This invention relates to a rocket propellant and explosive compound, and to a process for its preparation.

The compound of the invention is 1,2,5,6-tetrakis(difluoroamino)-3,4-hexanediol dinitrate. It is a dinitrate ester having four difluoroamino substituents in the molecule, and has the following molecular structure:

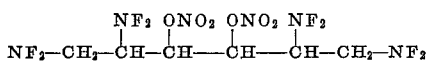

The compound has a high percentage of energetic groups, i.e., about 51% by weight of —$NF_2$ groups and 30% by weight of —$ONO_2$ groups. The high energy released upon the decomposition of nitrate esters has long been known. In recent years, the presence of —$NF_2$ groups in a molecule has become recognized as an important source of energy, compounds containing such groups having been found to impart a high specific impulse to rocket propellants. The novel compound of the present invention therefore presents great interest for use in rocket propellants as well as explosives.

1,2,5,6-tetrakis(difluoroamino)-3,4-hexanediol dinitrate can be prepared by the nitration of 1,2,5,6-tetrakis(difluoroamino)-3,4-hexanediol by nitric acid, preferably admixed with an agent which fixes the water liberated and promotes nitration. Agents which have been used for this purpose in the nitration of alcohols by nitric acid are sulfuric acid, acetic acid, acetic anhydride, trifluoroacetic anhydride, phosphoric acid, polyphosphoric acid, and others. In the preparation of the novel compound of the present invention, one can use any of the mixed acids commonly used in the nitration of alcohols, such as, for example, mixtures of nitric acid with one or more of the acids just mentioned. However, for economic reasons, the use of a nitric acid-sulfuric acid mixture is preferred. Mixtures having percent compositions corresponding to those ordinarily used in nitration reactions can be used, e.g., mixtures ranging from 20% $HNO_3$/60% $H_2SO_4$/20% $H_2O$ to 55% $HNO_3$/48% $H_2SO_4$ (said to have a negative percentage of water, —3%).

The amount of nitric acid used in the preparation of the novel compound of the invention is at least two moles per mole of diol, i.e., the stoichiometric amount required to esterify both hydroxyl groups in the diol. However, an excess, preferably a large excess, of nitric acid generally will be used in order to assure complete esterification. Thus, mole ratios of nitric acid to diol of 2/1 up to 50/1 or more can be used. The other acid ingredient in the mixed acid is used in an amount which is dependent on the amount of water present during the reaction and on the particular acid used. Generally, stronger acids will be used in lesser amounts than weaker acids.

The nitration of 1,2,5,6-tetrakis(difluoroamino)-3,4-hexanediol is effected in an inert solvent, which serves as a diluent helping to dissipate the heat of reaction and to decrease the oxidizing action of the nitric acid. Suitable solvents are, e.g., chloroform and methylene chloride. The inert solvent preferably is a low-boiling compound so as to be easily removed from the product.

The nitration preferably is carried out at a temperature within the range of about 15° C. to about 75° C. While lower temperatures can be used, they generally are not practical because of the low reaction rate and the cooling required. Temperatures above 75° C. also can be used, but operation at such temperatures generally is undesirable inasmuch as the dinitrate begins to decompose as the temperature approaches 100° C. and yield losses result. The process can be effected at atmospheric as well as superatmospheric pressure. Generally, however, there is no advantage in operating at superatmospheric pressure with the possible exception that such pressure may be desirable when a low-boiling solvent is used.

The following example serves to illustrate a preferred method of preparing the novel compound of the present invention. Parts are by weight. The example will be understood to be illustrative only and not to limit the invention in any manner.

In the synthesis described in the example, 1,2,5,6-tetrakis(difluoroamino)-3,4-hexanediol was prepared by the reaction of 1,5-hexadiene-3,4-diol with tetrafluorohydrazine. The procedure was as follows:

A solution of 6.84 parts of 1,5-hexadiene-3,4-diol in 112 parts of chloroform was heated to 100° C. in a magnetically agitated pressure reactor containing tetrafluorohydrazine at an initial pressure of 125 p.s.i.g. After 90 minutes' reaction time, the pressure had dropped to 80 p.s.i.g., where it remained constant. The reactor was cooled and the product solution discharged. The chloroform was removed under vacuum leaving an orange, viscous liquid which was shown to be 1,2,5,6-tetrakis (difluoroamino)-3,4-hexanediol by infrared and nuclear magnetic resonance spectra. The infrared spectrum of the compound showed very strong —OH absorption at 2.85μ and —$NF_2$ absorption at 10.4μ and 11.8μ. There was no olefinic absorption (6.05μ) as there had been in the spectrum of the 1,5-hexadiene-3,4-diol starting material.

EXAMPLE

Five parts of 1,2,5,6 - tetrakis(difluoroamino) - 3,4-hexanediol was dissolved in 27 parts of methylene chloride. The solution was added dropwise to 34 parts of a stirred mixture of 50% nitric acid and 50% sulfuric acid (by weight), cooling being applied to maintain the initial temperature below 25° C. After all of the diol had been added, the mixture was stirred rapidly for 6 hours, and then poured over ice. The methylene chloride layer was separated, washed with water until neutral, dried over magnesium sulfate, and the methylene chloride removed under vacuum, leaving a yellow viscous liquid product, which was identified as 1,2,5,6-tetrakis(difluoroamino)-3,4-hexanediol dinitrate by nuclear magnetic resonance and infrared spectra. The infrared spectrum of the compound showed strong nitrate absorption at 5.89μ and 7.81μ, and —$NF_2$ absorption at 10.25μ. There was no —OH absorption. The proton and fluorine resonance spectra showed the presence of —$CH_2NF_2$, —$CHNF_2$, and —CH($NF_2$)—CH—O—.

1,2,5,6-tetrakis(difluoroamino)-3,4-hexanediol dinitrate is an explosive compound as well as a propellant as evidenced by the following properties:

Sensitivity to heat

The decomposition temperature of the compound was measured by heating a sample gradually (ca. 5° C./minute) in a copper block. The compound began fuming at 140° C. and underwent violent decomposition at 155° C.

Impact sensitivity

The impact sensitivity of the compound was determined by the number of explosions produced by the drop of a weight onto the material. The drop of a 2-kg. weight through 3 inches onto the material produced explosion in 50% of the trials.

Specific impulse

The calculated specific impulse (frozen) as a monopropellant is 280 sec.; the calculated specific impuse (shifting) is 284 sec.

Although in the foregoing example, the diol starting material had been separated from the chlorofrom solvent prior to nitration, such a separation is unnecessary since the diol solution can be used in the nitration, the same solvent being used for the diol preparation and the nitration.

The invention has been described in detail in the foregoing. It will be apparent to those skilled in the art that many variations are possible without departure from the scope of the invention. Therefore, I intend to be limited only by the following claims.

I claim:

1. A process for the preparation of 1,2,5,6-tetrakis(difluoroamino)-3,4-hexanediol dinitrate which comprises reacting 1,2,5,6-tetrakis(difluoroamino)-3,4-hexanediol with a nitrating acid in an inert solvent at a temperature within the range of about 15° C. to about 75 °C.

2. A process according to claim 1, wherein the nitrating acid is a mixture of nitric acid and sulfuric acid.

3. A process according to claim 1, wherein the inert solvent is a chlorinated hydrocarbon.

References Cited
UNITED STATES PATENTS 2,883,414    4/1959    Wilt et al. _____ 260—467

OTHER REFERENCES

Hoffman et al.: Chemical Reviews, vol. 62, pp. 15 to 18 (1962).

CARL D. QUARFORTH, *Primary Examiner.*

ROGER L. CAMPBELL, *Examiner.*

J. W. WHISLER, L. A. SEBASTIAN,
*Assistant Examiners.*